(12) United States Patent
Park et al.

(10) Patent No.: US 9,509,635 B2
(45) Date of Patent: Nov. 29, 2016

(54) METHOD AND APPARATUS FOR ALLOWING PLAYBACK DEVICES TO PERFORM SYNCHRONIZED PLAYBACK OF STREAMING CONTENT

(71) Applicant: Samsung Electronics Co., Ltd., Suwon-si, Gyeonggi-do (KR)

(72) Inventors: Hyun-cheol Park, Seoul (KR); Won-joo Park, Gwangju-si (KR); Jae-hoon Ko, Suwon-si (KR); Woo-jin Park, Yongin-si (KR); Hun-je Yeon, Seoul (KR); Jin-wook Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/205,998

(22) Filed: Mar. 12, 2014

(65) Prior Publication Data

US 2014/0269757 A1 Sep. 18, 2014

(30) Foreign Application Priority Data

Mar. 13, 2013 (KR) .................. 10-2013-0026820

(51) Int. Cl.
*H04L 12/931* (2013.01)
*H04L 29/06* (2006.01)
*H04N 21/43* (2011.01)

(52) U.S. Cl.
CPC ......... *H04L 49/201* (2013.01); *H04L 65/4076* (2013.01); *H04L 65/80* (2013.01); *H04N 21/4305* (2013.01); *H04N 21/4307* (2013.01)

(58) Field of Classification Search
CPC . H04L 49/201; H04L 65/80; H04L 65/4076; H04N 21/4635
See application file for complete search history.

(56) References Cited

U.S. PATENT DOCUMENTS

| 7,916,758 | B2 | 3/2011 | Sun et al. | |
| 7,924,806 | B2 | 4/2011 | Yamaji | |
| 8,316,154 | B2 | 11/2012 | Yoneda | |
| 2004/0008646 | A1* | 1/2004 | Park et al. | 370/331 |
| 2006/0234684 | A1 | 10/2006 | Shin | |
| 2006/0270395 | A1 | 11/2006 | Dhawan et al. | |
| 2008/0022320 | A1 | 1/2008 | Ver Steeg | |
| 2008/0177822 | A1* | 7/2008 | Yoneda | 709/202 |
| 2008/0240075 | A1 | 10/2008 | Yamaji | |
| 2009/0091655 | A1* | 4/2009 | Russell et al. | 348/515 |
| 2009/0310726 | A1 | 12/2009 | Alankry et al. | |
| 2010/0020909 | A1 | 1/2010 | Jung et al. | |
| 2011/0276648 | A1* | 11/2011 | Soldan | G06F 1/12 709/208 |
| 2012/0005517 | A1 | 1/2012 | Foster et al. | |
| 2012/0054793 | A1 | 3/2012 | Kang et al. | |
| 2012/0155497 | A1 | 6/2012 | Lee et al. | |
| 2012/0159026 | A1 | 6/2012 | Kataoka et al. | |
| 2012/0317278 | A1* | 12/2012 | Tamaki et al. | 709/224 |
| 2013/0182695 | A1 | 7/2013 | Hahm et al. | |

FOREIGN PATENT DOCUMENTS

| CN | 1997027 A | 7/2007 |
| CN | 101212823 A | 7/2008 |
| CN | 101729180 A | 6/2010 |
| JP | 2004-535696 A | 11/2004 |
| JP | 2012-500430 A | 1/2012 |
| KR | 10-2005-0011977 A | 1/2005 |
| KR | 10-2008-0080758 A | 9/2008 |
| KR | 10-2012-0068582 A | 6/2012 |
| KR | 10-2013-0084900 A | 7/2013 |
| WO | 02/073851 A1 | 9/2002 |

\* cited by examiner

*Primary Examiner* — Mohammad Anwar
(74) *Attorney, Agent, or Firm* — Jefferson IP Law, LLP (57) ABSTRACT

An apparatus and method for allowing a plurality of playback devices to stream content of a master device simultaneously is provided. When the master device selects one of the playback devices as a reference device and multicasts a synchronization packet to the playback devices, the playback devices determine a synchronization time by comparing their own synchronization packet reception time with a synchronization packet reception time of the reference device. When the master device streams content, into which a time stamp is inserted based on the time of the reference device, the playback devices play the content based on the determined synchronization time. Therefore, even when the playback devices have different network latencies from the master device, the playback devices may accurately perform synchronized content playback.

27 Claims, 10 Drawing Sheets

METHOD AND APPARATUS FOR ALLOWING PLAYBACK DEVICES TO PERFORM SYNCHRONIZED PLAYBACK OF STREAMING CONTENT

CROSS-REFERENCE TO RELATED APPLICATION(S)

This application claims the benefit under 35 U.S.C. §119 (a) of a Korean patent application filed on Mar. 13, 2013 in the Korean Intellectual Property Office and assigned Serial number 10-2013-0026820, the entire disclosure of which is hereby incorporated by reference.

TECHNICAL FIELD

The present disclosure relates to methods and apparatuses for streaming and playing content.

BACKGROUND

The term "streaming" refers to a technology for allowing a client, which has a function for processing media content, to start content playback even when the client has only received a portion, but not all, of the content stored in a server. Before streaming starts, time synchronization is performed between the server and the client. In general, the server periodically transmits current time information to the client, and the client performs time synchronization based on the time information received from the server.

However, in this related art method, when there are a plurality of clients, a synchronization error is apt to occur between the clients. This is because the amount of time it takes for synchronization time information, which is transmitted by the server, to reach each playback device, that is, network latency, may vary depending on the wireless network environments of the clients. In particular, in a case where a plurality of playback devices play media content such as music, an echo detectable by humans may occur even when a synchronization error between clients is very small. Therefore, accurate synchronization is required between streaming clients that play the same content simultaneously.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide methods and apparatuses for allowing a group of playback devices to stream and play content, which is stored in a master device, with accurate synchronization.

Additional aspects will be set forth in part in the description which follows and, in part, will be apparent from the description, or may be learned by practice of the presented various embodiments.

In accordance with an aspect of the present disclosure, a method of allowing a master device to stream content to a plurality of playback devices is provided. The method includes selecting one of the playback devices as a reference device, notifying an identifier of the reference device to the playback devices, multicasting a synchronization packet to the playback devices to allow the playback devices to determine a synchronization time with the reference device based on a reception time, and streaming content, into which a time stamp is inserted based on the time of the reference device, to the playback devices.

The method may further include when a join request for a group including the playback devices is received from a new playback device during the streaming, notifying the identifier of the reference device to the new playback device, multicasting a synchronization packet to the new playback device and the playback devices to allow the new playback device to determine a synchronization time with the reference device based on a reception time, and additionally streaming content, into which a time stamp is inserted based on the time of the reference device, to the new playback device.

The selecting of one of the playback devices as the reference device may include selecting a playback device, which is first discovered in a process of discovering the playback devices according to a communication protocol, as a reference device.

The method may further include when a join request for a group including the playback devices is received from a new playback device during the streaming after the reference device leaves the group including the playback devices, selecting a new reference device among other playback devices except the new playback device, notifying an identifier of the new reference device to the new playback device, multicasting a synchronization packet to the new playback device and the other playback devices to allow the new playback device to determine a synchronization time with the reference device, which has left the group, based on a reception time in the new reference device, and additionally streaming content, into which a time stamp is inserted based on the time of the reference device that has left the group, to the new playback device.

The selecting of the new reference device may include selecting a playback device, which is discovered next to the reference device in the discovery process, as a new reference device.

The multicasting of the synchronization packet may include sequentially multicasting a plurality of synchronization packets having different sequence numbers to allow the playback devices to accurately determine a synchronization time.

The synchronization time may represent a system clock difference between each of the playback devices and the reference device.

Another aspect of the present disclosure is to provide a non-transitory computer-readable recording medium that stores a program which, when executed by a computer, performs the above streaming method.

In accordance with another aspect of the present disclosure, a master device is provided. The master device includes a memory configured to store at least one program, and a processor configured to stream content to a plurality of playback devices by executing the at least one program, wherein the at least one program may include instructions for selecting one of the playback devices as a reference device, notifying an identifier of the reference device to the playback devices, multicasting a synchronization packet to the playback devices to allow the playback devices to determine a synchronization time with the reference device based on a reception time, and streaming content, into which a time stamp is inserted based on the time of the reference device, to the playback devices.

The at least one program may further include instructions for, when a join request for a group including the playback devices is received from a new playback device during the streaming, notifying the identifier of the reference device to the new playback device, multicasting a synchronization packet to the new playback device and the playback devices to allow the new playback device to determine a synchronization time with the reference device based on a reception time, and additionally streaming content, into which a time stamp is inserted based on the time of the reference device, to the new playback device.

The selecting of one of the playback devices as the reference device may include selecting a playback device, which is first discovered in a process of discovering the playback devices according to a communication protocol, as a reference device.

The at least one program may further include instructions for, when a join request for a group including the playback devices is received from a new playback device during the streaming after the reference device leaves the group including the playback devices, selecting a new reference device among other playback devices except the new playback device, notifying an identifier of the new reference device to the new playback device, multicasting a synchronization packet to the new playback device and the other playback devices to allow the new playback device to determine a synchronization time with the reference device, which has left the group, based on a reception time in the new reference device, and additionally streaming content, into which a time stamp is inserted based on the time of the reference device that has left the group, to the new playback device.

The selecting of the new reference device may include selecting a playback device, which is discovered next to the reference device in the discovery process, as a new reference device.

The multicasting of the synchronization packet may include sequentially multicasting a plurality of synchronization packets having different sequence numbers to allow the playback devices to accurately determine a synchronization time.

The synchronization time may represent a system clock difference between each of the playback devices and the reference device.

In accordance with another aspect of the present disclosure, a method of allowing one of a plurality of playback devices to play content streamed from a master device, simultaneously with other playback devices is provided. The method includes obtaining an identifier of a reference device selected among the payback devices by the master device, determining a synchronization time with the reference device by comparing a reception time of a synchronization packet, which is multicast from the master device to the playback devices, with the time of the reference device indicated by the identifier, and playing the content streamed from the master device, in synchronization with the reference device based on the determined synchronization time.

The content streamed from the master device may include a time stamp that is generated based on the time of the reference device.

The determining of the synchronization time may include determining reception time difference values from the reference device with respect to a plurality of synchronization packets having different sequence numbers, and determining an average value of the reception time difference values with respect to the plurality of synchronization packets as the synchronization time with the reference device.

The obtaining of the identifier of the reference device may include receiving the identifier of the reference device from the master device.

The method may further include receiving a new synchronization packet and a message indicating that a new reference device has been selected, from the master device, receiving an inquiry about a reception time of the new synchronization packet, from a new playback device other than the playback devices, and notifying a value reflecting the determined synchronization time in response to the inquiry at the reception time of the new synchronization packet.

The determining of the synchronization time may include determining a system clock difference from the reference device based on the reception time of the synchronization packet.

In accordance with another aspect of the present disclosure, a playback device includes a memory configured to store at least one program, and a processor configured to allow one of a plurality of playback devices to play content, which is streamed from a master device, simultaneously with other playback devices by executing the at least one program, wherein the at least one program may include instructions for obtaining an identifier of a reference device selected among the payback devices by the master device, determining a synchronization time with the reference device by comparing a reception time of a synchronization packet, which is multicast from the master device to the playback devices, with the time of the reference device indicated by the identifier, and playing the content streamed from the master device, in synchronization with the reference device based on the determined synchronization time.

The content streamed from the master device may include a time stamp that is generated based on the time of the reference device.

The determining of the synchronization time may include determining reception time difference values from the reference device with respect to a plurality of synchronization packets having different sequence numbers, and determining an average value of the reception time difference values with respect to the plurality of synchronization packets as the synchronization time with the reference device.

The obtaining of the identifier of the reference device may include receiving the identifier of the reference device from the master device.

The at least one program may further include instructions for receiving a new synchronization packet and a message indicating that a new reference device has been selected, from the master device, receiving an inquiry about a reception time of the new synchronization packet, from a new playback device other than the playback devices, and notifying a value reflecting the determined synchronization time in response to the inquiry at the reception time of the new synchronization packet.

The determining of the synchronization time may include determining a system clock difference from the reference device based on the reception time of the synchronization packet.

In accordance with another aspect of the present disclosure, a non-transitory computer-readable recording medium is provided. The non-transitory computer-readable recording medium stores a program that, when executed by a computer, performs the above method for playing streaming content.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces Hereinafter, various embodiments of the present disclosure will be described with reference to the accompanying drawings.

Figure 1:
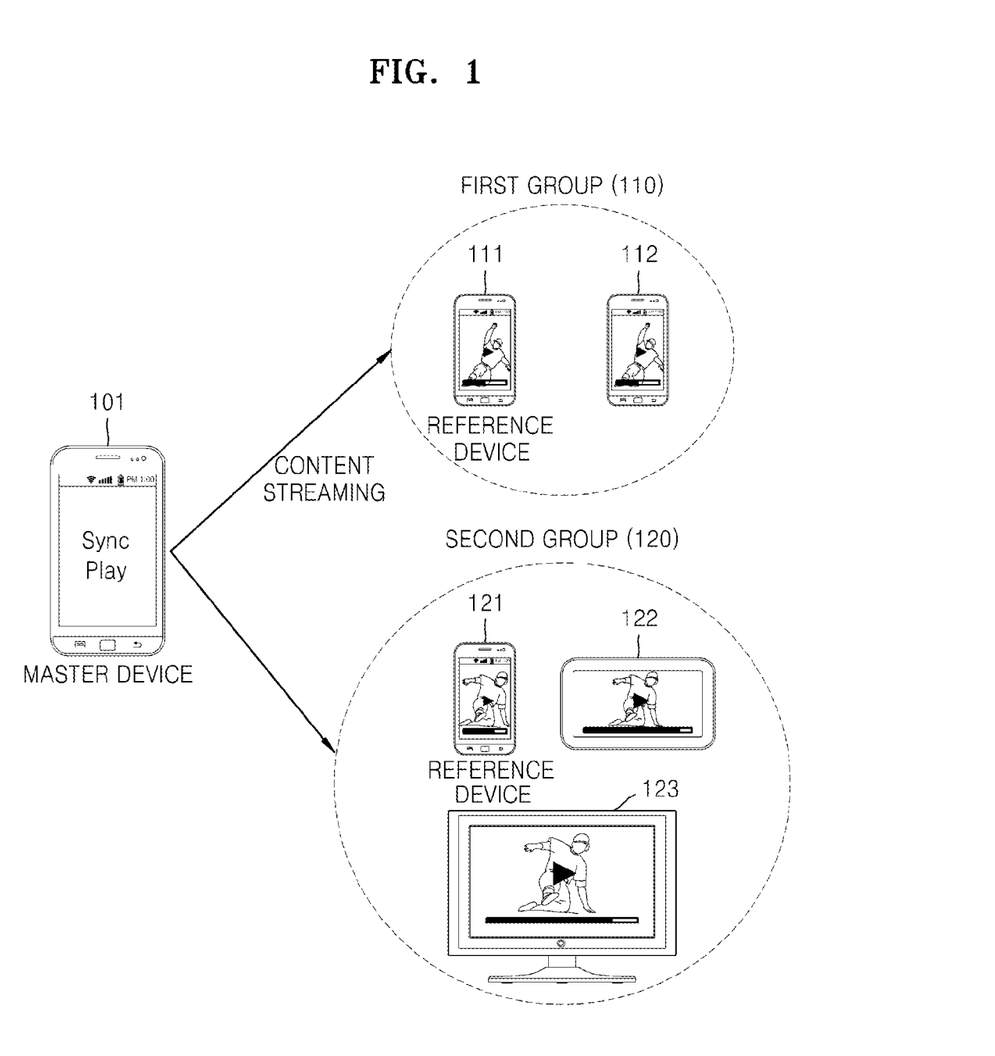
FIG. 1 is a schematic diagram illustrating a method for a plurality of playback devices to perform synchronized playback according to an embodiment of the present disclosure.

FIG. 1 is a schematic diagram illustrating a method for a plurality of playback devices to perform synchronized playback according to an embodiment of the present disclosure. Hereinafter, a master device refers to a terminal operating as a streaming server that retains content, and a playback device refers to a terminal operating as a streaming client that plays the content of the master device.

According to an embodiment of the present disclosure, a master device may connect with various playback devices on a network through a discovery process. Various communication protocols may be used in the discovery process, and a communication protocol for implementing the inventive concept is not limited to a particular one. For example, the master device may discover playback devices on the network through an M-Search message used in Universal Plug and Play (UPnP).

Figure 2:
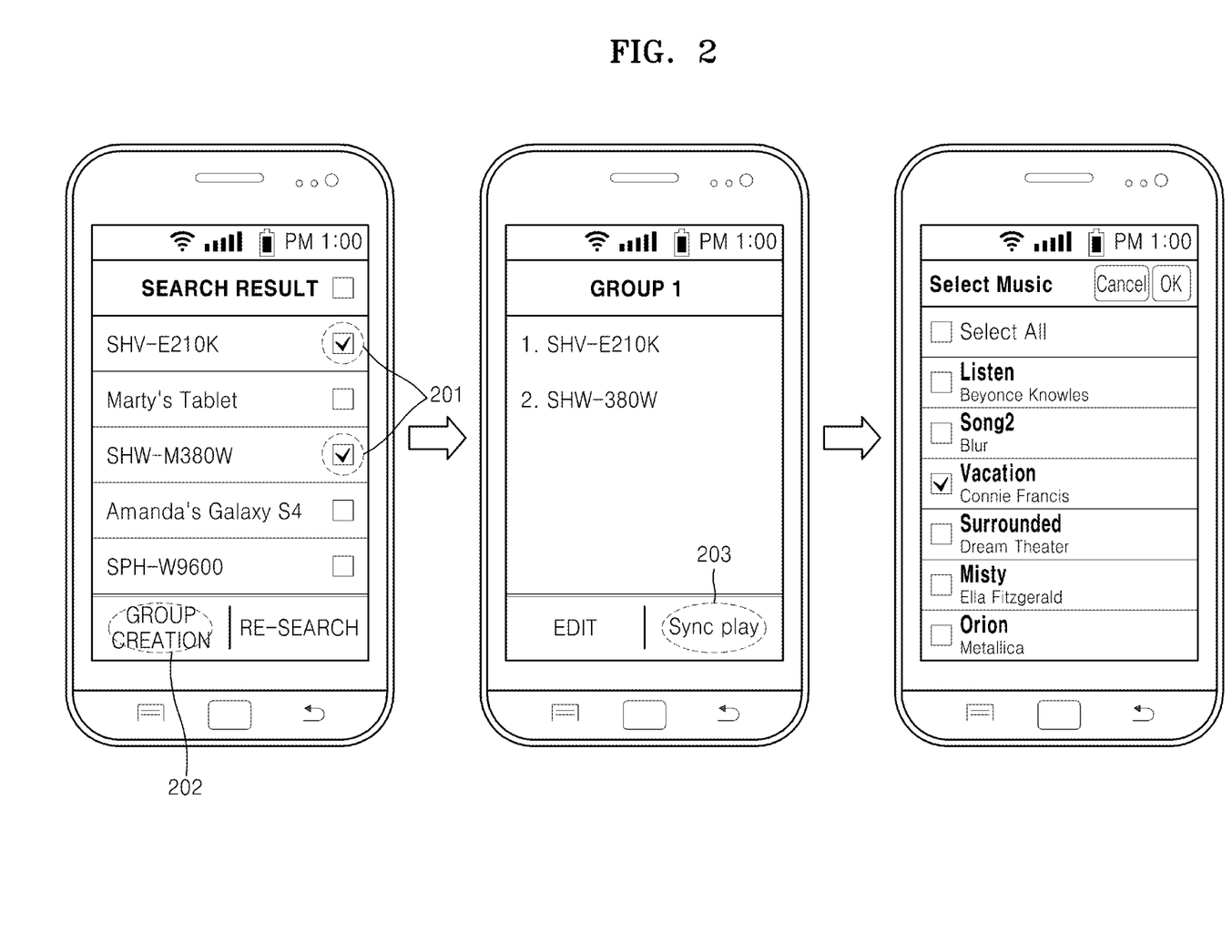
FIG. 2 is a diagram illustrating screens that are displayed to a user when a master device creates a group according to an embodiment of the present disclosure.

Referring to FIG. 1, a master device 101 has discovered playback devices 111, 112, 121, 122, and 123 on the network, has created a first group 110 including the two playback devices 111 and 112, and has created a second group 120 including the other three playback devices 121, 122, and 123. In the group creation process, the master device 101 may provide a user with a User Interface (UI) through a screen, as illustrated in FIG. 2.

When the user requests all the playback devices 121, 122, and 123 of the second group 120 to simultaneously play content through the master device 101, the master device 101 selects one of the playback devices 121, 122, and 123 of the second group 120, for example, the playback device 121, as a reference device and multicasts a synchronization packet to all the playback devices 121, 122, and 123 of the second group 120 so that the playback devices 122 and 123 of the second group 120 may determine a clock difference from the reference device, i.e., the playback device 121. That is, the playback devices 121, 122, and 123 of the second group 120 do not perform time synchronization with the master device 101, but rather determine a clock difference between the reference device 121 and the playback devices 122 and 123 based on the difference between a synchronization packet reception time of the reference device 121 and a synchronization packet reception time of the playback devices 122 and 123. According to an embodiment of the present disclosure, the clock difference may include a synchronization time, and the synchronization time may refer to a system clock difference between the reference device 121 and each of the playback devices 122 and 123.

Herein, the clock difference determined based on the synchronization packet reception time may not be exactly equal to the actual system clock difference between the reference device 121 and each of the playback devices 122 and 123. This is because the arrival time of the synchronization packet from the master device 101 may vary depending on the wireless network environments of the playback devices and thus the reception packet reception time difference and the system clock difference may be different.

However, in order for all the playback devices 121, 122, and 123 to perform synchronized playback, the other playback devices 122 and 123 except the reference device 121 only have to play the content of the master device 101 at regular intervals with respect to the synchronization packet reception time difference from the reference device 121 and do not need to determine an accurate system clock difference from the reference device 121. That is, the "clock difference" refers to an assumed system clock difference from the reference device 121 for synchronized playback by the other playback devices 122 and 123 except the reference device 121, and does not refer to an accurate system clock difference between the other playback devices 122 and 123 except the reference device 121. Also, the playback devices may determine the synchronization time with the reference device 121 based on the clock difference (or system clock difference).

When the master device 101 inserts a time stamp into the content based on the clock of the reference device 121 and streams the content, including the time stamp, to the playback devices 121, 122, and 123 of the second group 120, the playback devices 121, 122, and 123 of the second group 120 process the content based on the clock difference from the reference device 121. Accordingly, all the playback devices 121, 122, and 123 of the second group 120 may accurately perform synchronized streaming playback.

FIG. 2 is a diagram illustrating screens that are displayed to a user when a master device creates a group according to an embodiment of the present disclosure.

Referring to FIG. 2, the left diagram illustrates a screen of a terminal (master device) that displays the search result of the user for other terminals (playback devices). When the user selects terminals to be included in a group (201) and inputs a group creation command (202), a first group 1, including the terminals selected by the user, is created as illustrated in the center diagram of FIG. 2 and the terminal of the user becomes a master device in the first group 1. In addition, as illustrated in the center diagram of FIG. 2, the master device may provide an <EDIT> menu for editing each of the terminals of the first group 1. Also, the master device may provide a <Sync Play> menu for controlling the terminals of the first group 1 to perform synchronized streaming playback of the content of the master device according to various embodiments of the present disclosure.

When the user selects the <Sync Play> menu (203), the master device may provide a user interface for selecting a music file to be played by the terminals of the first group 1, as illustrated in the right diagram of FIG. 2.

Figure 3:
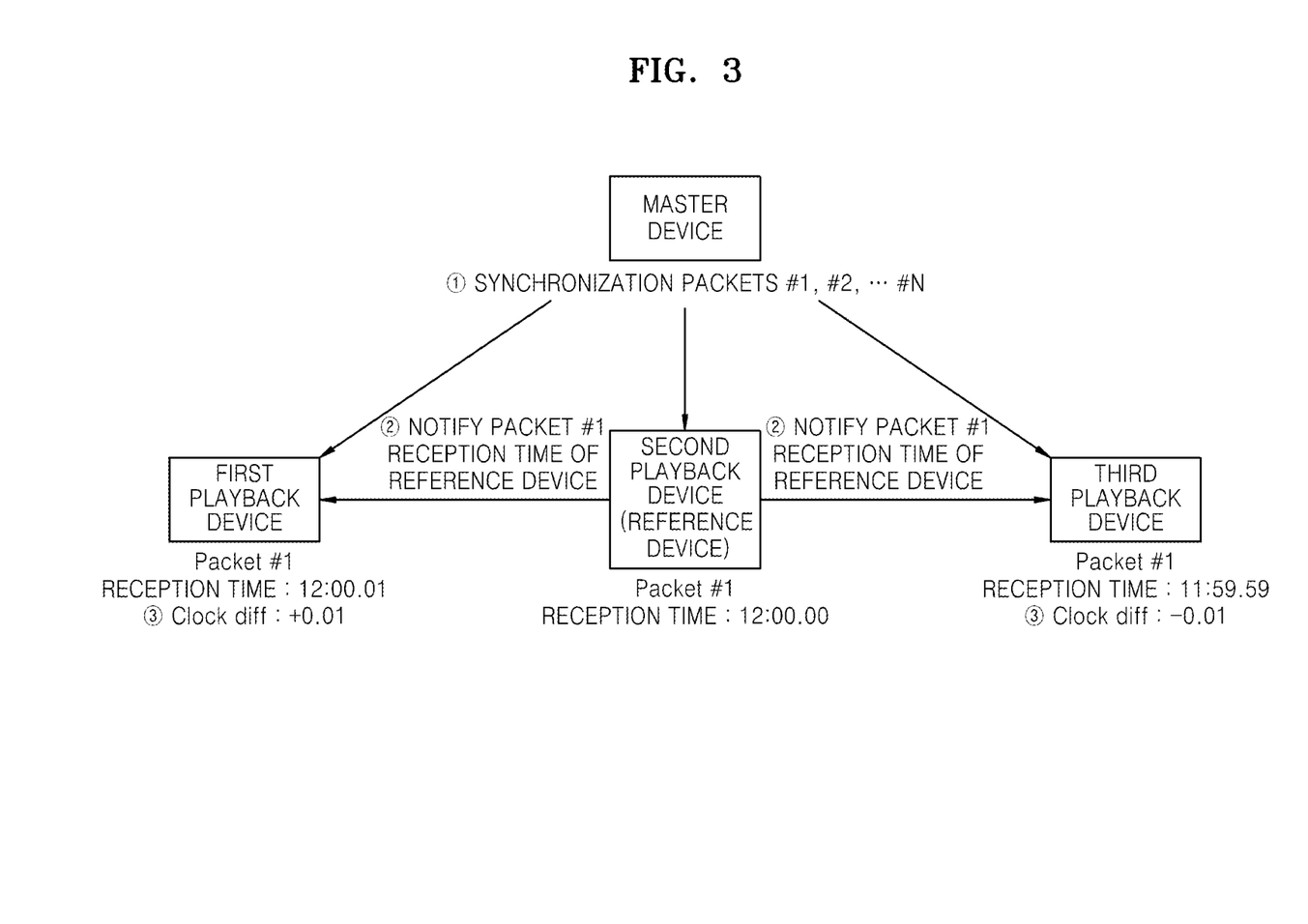
FIG. 3 is a schematic diagram illustrating a method for a plurality of playback devices to perform time synchronization according to an embodiment of the present disclosure.

FIG. 3 is a schematic diagram illustrating a method for a plurality of playback devices to perform time synchronization according to an embodiment of the present disclosure.

Referring to FIG. 3, a master device multicasts a synchronization packet to the playback devices for synchronization between the playback devices. The master device may transmit single synchronization packet. However, for more accurate synchronization, the master device may sequentially multicast N synchronization packets having different sequence numbers to the playback devices of a group (①).

In the present embodiment, the group includes three playback devices, and a second playback device is selected as a reference device. The reference device notifies the reception time of the first synchronization packet to the other playback devices (②). The reference device may notify the synchronization packet reception time to the other playback devices through an inquiry and response process, or may notify the synchronization packet reception time to the other playback devices automatically upon receiving the synchronization packet.

As an example, the reception time of the first synchronization packet by the reference device is 12:00.00, while the reception time of the first synchronization packet by the first playback device is 12:00.01 and the reception time of the first synchronization packet by the second playback device is 11:59.59. The other playback devices except the reference device determine a clock difference from the reference device (③). The playback devices may use a single synchronization packet to perform synchronization, but may use N synchronization packets for more accurate synchronization. That is, the other playback devices may determine an average value of the clock differences of the N synchronization packets as a final clock difference and determine a synchronization time based on the clock difference.

The master device inserts a time stamp into the content based on the system clock of the reference device, and the three playback devices process the content with reflection of the clock difference determined in the synchronization process, thereby implementing synchronized playback. A processing of the content, into which the time stamp is inserted, by the playback devices having different clock differences will be described below in more detail.

Figure 4:
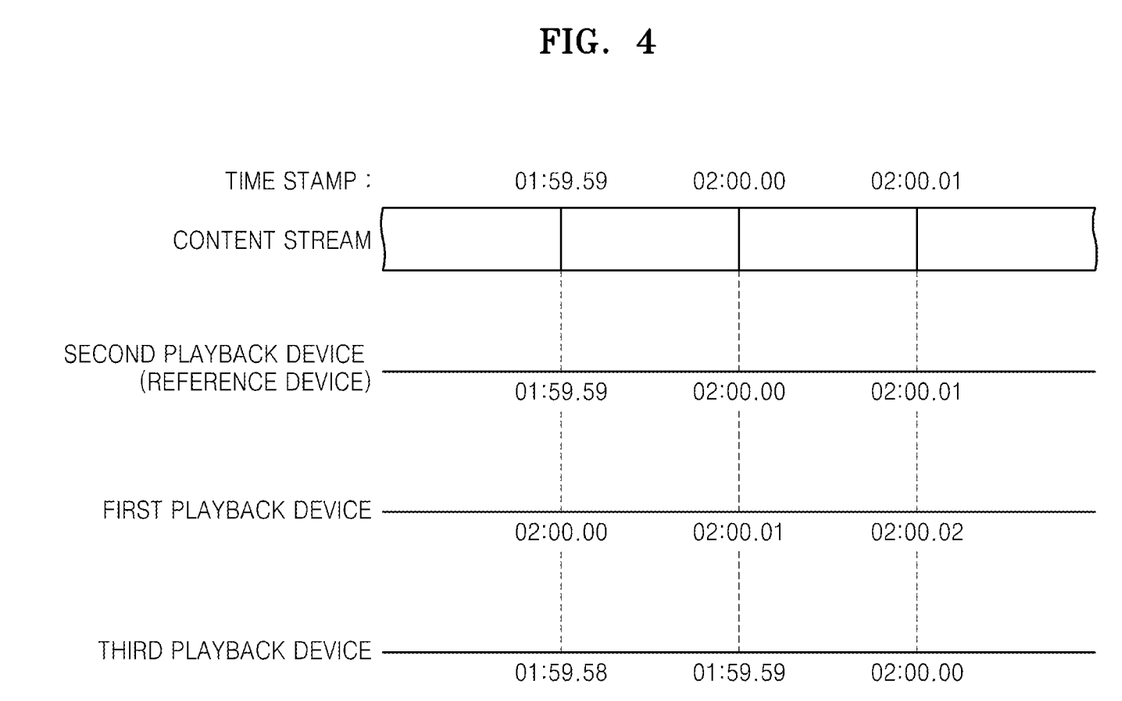
FIG. 4 is a diagram illustrating a method for a plurality of playback devices to process content into which a time stamp is inserted according to an embodiment of the present disclosure.

FIG. 4 is a diagram illustrating a method for a plurality of playback devices to process content into which a time stamp is inserted according to an embodiment of the present disclosure.

Referring to FIG. 4, it is assumed that first, second, and third playback devices are the first, second, and third playback devices illustrated in FIG. 3. That is, the reference device is the second playback device, the clock difference of the first playback device is 0.01 seconds, and the clock difference of the third playback device is −0.01 seconds. Since a time stamp is inserted into a content stream based on the clock of the reference device, the three playback devices have to process the content stream with reflection of the clock difference in order to perform synchronized playback. For example, when a portion of the content stream having a time stamp of 02:00.01 is to be played back, the second playback device, which is the reference device, performs playback at 02:00.00 that is the same time as the time stamp on its own clock, but the first playback device and the third playback device have to perform playback at 02:00.01 and 01:59.59 on their own clocks, respectively.

Figure 5:
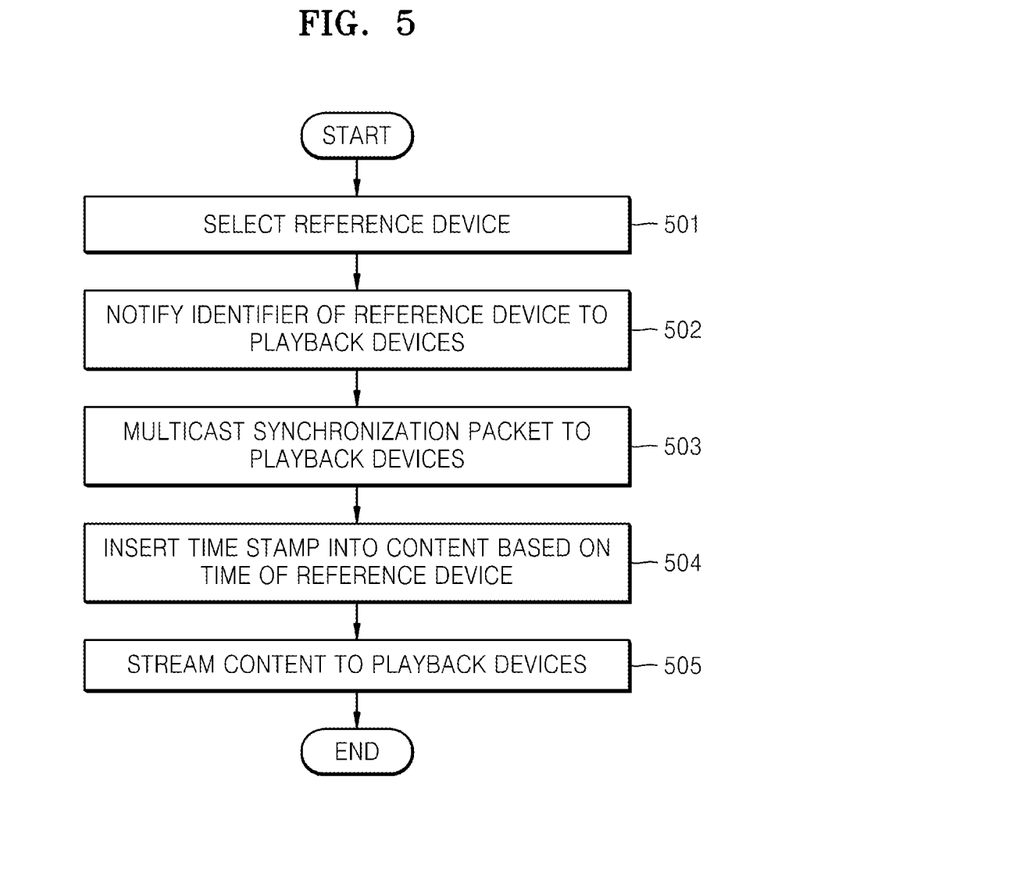
FIG. 5 is a flowchart of an operation process of a master device according to an embodiment of the present disclosure.

FIG. 5 is a flowchart of an operation process of a master device according to an embodiment of the present disclosure.

In operation 501, the master device selects a reference device. The operation of selecting the reference device may be performed in a group creation process, or may be performed when the user inputs a command for requesting the playback devices of a group to perform synchronized playback.

The reference device may be selected among the playback devices of the group based on various factors. For example, the master device may select a device, which is first discovered in the discovery process, as the reference device. In other examples, the master device may randomly select one of the playback devices of the group as the reference device, and may select the reference device based on channel conditions or resources of the playback devices.

In operation 502, the master device notifies an identifier of the reference device to the playback devices. The identifier of the reference device may include an IP address and a device ID provided by a terminal manufacturer.

In operation 503, the master device multicasts a synchronization packet to the playback devices. As described above, the playback devices may determine a synchronization time with the reference device based on the reception time of the synchronization packet. According to an embodiment of the present disclosure, the playback devices may determine a clock difference from the reference device based on the reception time of the synchronization packet.

In operation 504, the master device inserts a time stamp into the content based on the time of the reference device. That is, the master device inserts a time stamp into the content based on the clock of the reference device. To this end, the master device may inquire the reference device about the current time, determine a playback time in the reference device by reflecting network latency in a response of the reference device to the inquiry, and insert a time stamp into the content based on the determination.

In operation 505, the master device streams the content, including the time stamp, to the playback devices of the group. For seamless streaming, content data may be transmitted by unicast that has a smaller packet loss than multicast.

Figure 6:
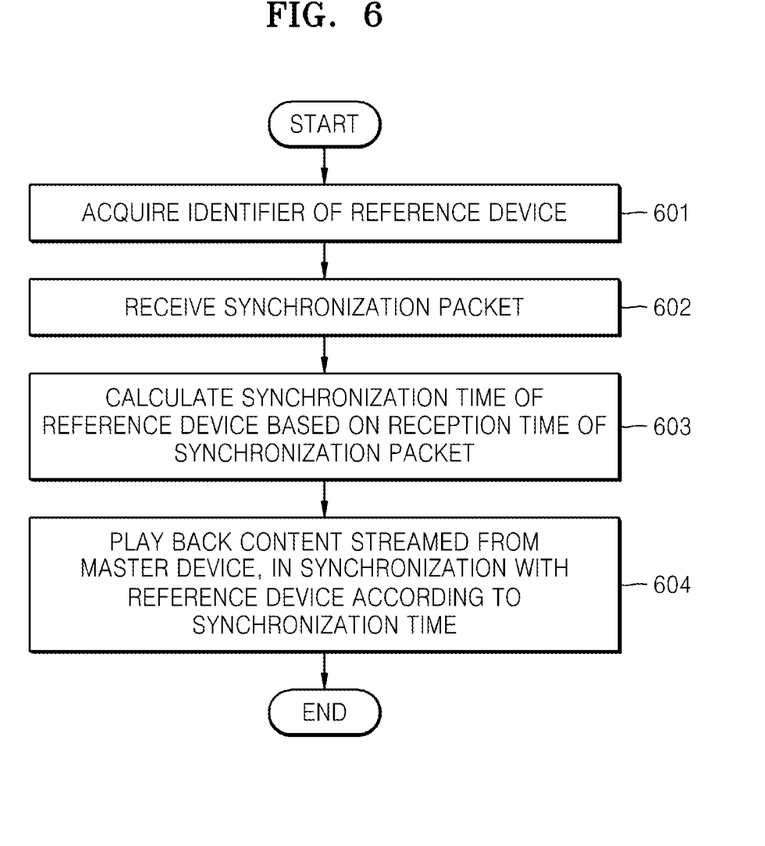
FIG. 6 is a flowchart of an operation process of a playback device according to an embodiment of the present disclosure.

FIG. 6 is a flowchart of an operation process of a playback device according to an embodiment of the present disclosure.

Referring to FIG. 6, the playback device refers to a playback device that is not the reference device. In operation 601, the playback device obtains an identifier of the reference device. Based on the identifier of the reference device, the playback device may detect which playback device in the group is the reference device. The identifier of the reference device may be notified to the other playback devices by the master device or by the reference device. Alternatively, when there is no notification, the playback devices may recognize the playback, which is first registered in the group, as the reference device.

In operation 602, the playback device receives a synchronization packet that is multicast from the master device.

In operation 603, the playback device determines a synchronization time with the reference device based on the reception time of the synchronization packet. According to an embodiment of the present disclosure, the playback device may determine a clock difference from the reference device based on the reception time of the synchronization packet. To this end, the playback device may inquire the reference device about the reception time, or the reference device may notify the reception time to the other playback devices automatically upon receiving the synchronization packet, even when there is no inquiry. As described above, for more accurate synchronization, an average value of the determined clock differences of a plurality of synchronization packet having different sequence numbers may be determined as the final clock difference or the synchronization time.

In operation 604, the playback device plays the content streamed from the master device, in synchronization with the reference device based on the synchronization time. That is, according to an embodiment of the present disclosure, the playback device may play the content streamed from the master device, in synchronization with the reference device based on the determined clock difference.

Figure 7:
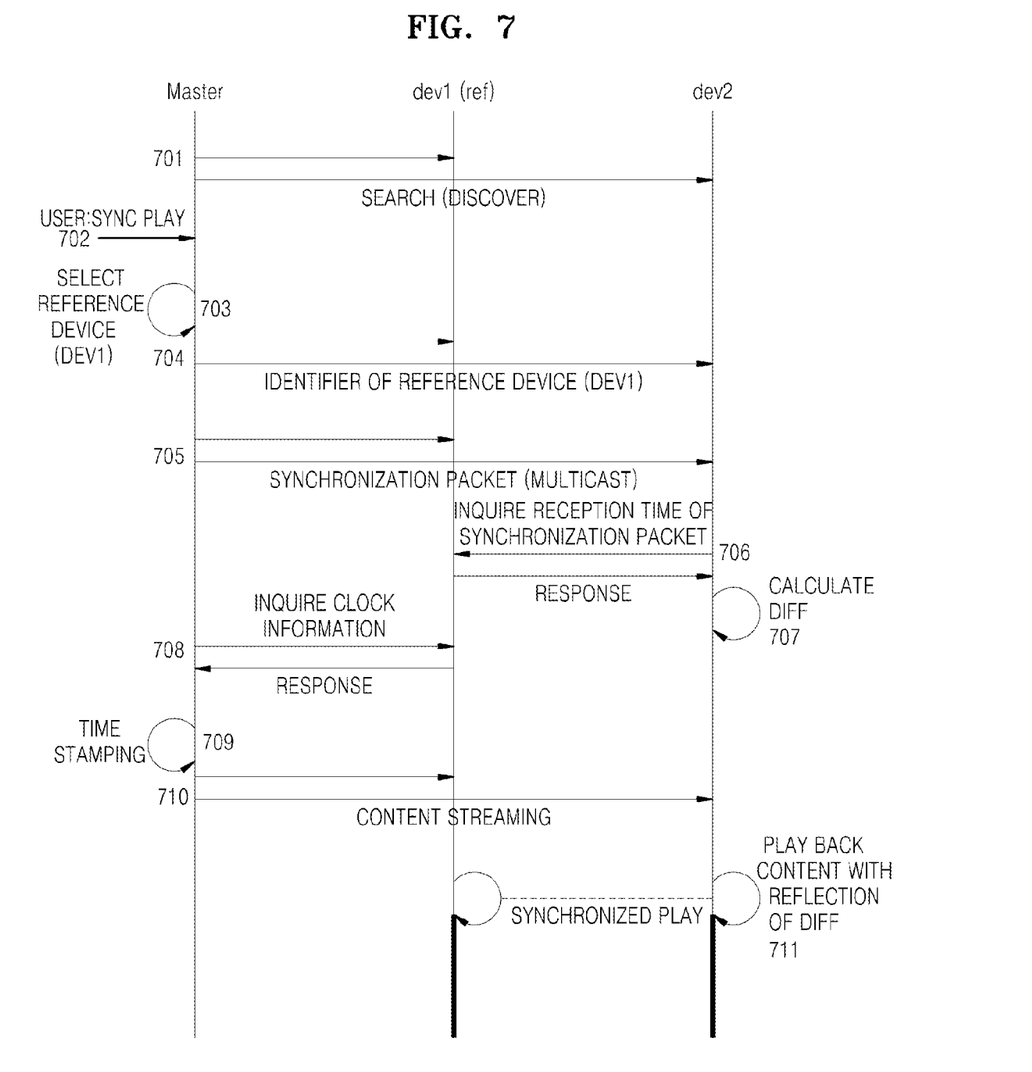
FIG. 7 is a flow diagram illustrating a method for a plurality of playback devices to perform synchronized playback of content of a master device according to an embodiment of the present disclosure.

FIG. 7 is a flow diagram illustrating a method for a plurality of playback devices to perform synchronized playback of content of a master device according to an embodiment of the present disclosure.

Referring to FIG. 7, the master device discovers a first playback device and a second payback device and designates the same as one group in operation 701. As described above, a communication protocol used in this discovery process is not limited to a particular one.

In operation 702, the master device receives a command that is input by the user to request members (e.g., first playback device and second playback device) of the group to perform synchronized playback of the content.

In operation 703, the master device selects the first playback device among the group members as a reference device. As described above, the reference device may be selected based on various factors such as discovery order, channel conditions, and resources of devices.

In operation 704, the master device notifies the reference device to the group members. That is, the master device notifies an identifier of the first playback device to the group members. Herein, the identifier of the reference device may include an IP address and a device ID provided by a terminal manufacturer.

In operation 705, the master device multicasts a synchronization packet to the group members.

In operation 706, the second playback device inquires the reference device (first playback device) about the reception time of the synchronization packet by using the identifier received in operation 704, and obtains a synchronization packet reception time of the reference device as a response to the inquiry.

In operation 707, the second playback device determines a clock difference by comparing its own synchronization packet reception time with the synchronization packet reception time of the reference device. That is, the second playback device may determine a synchronization time with the reference device. As described above, a plurality of synchronization packets having different sequence numbers may be used to perform accurate time synchronization.

In operation 708, the master device obtains the time of the reference device, that is, clock information of the reference device.

In operation 709, the master device inserts a time stamp into the content based on the clock information of the reference device. In more detail, the master device may perform time stamping based on not only the clock information of the reference device but also the latency depending on the channel conditions between the master device and the reference device.

In operation 710, the master device streams the content including a time stamp to the group members.

In operation 711, the second playback device plays the content with reflection of the clock difference determined in operation 707. That is, the second playback device may play the content based on the determined synchronization time. Also, since the content is processed based on the clock difference, the second playback device plays the same portion of the content as the one played by the reference device at the same time as the first playback device that is the reference device (synchronized playback).

Figure 8:
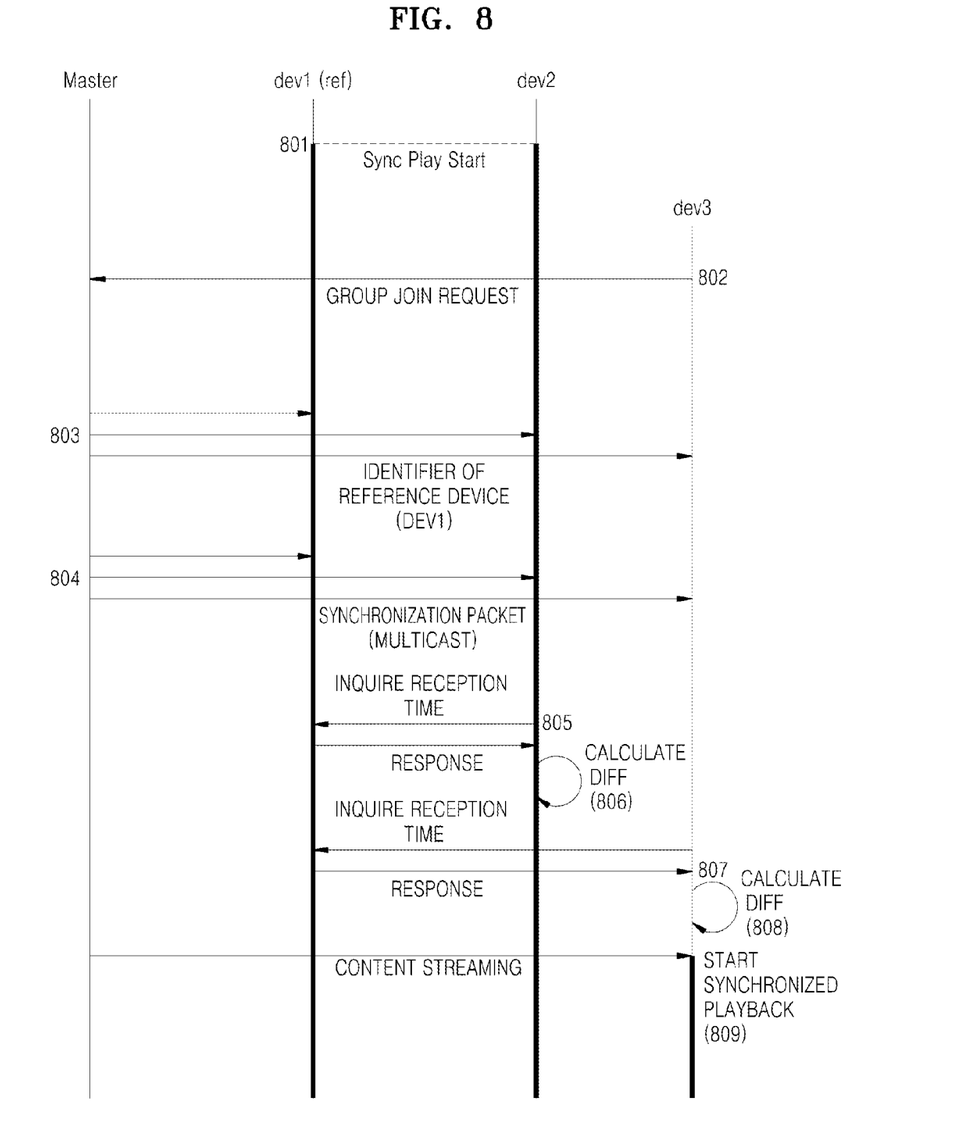
FIG. 8 is a flow diagram illustrating a case where a new playback device joins a group while a plurality of playback devices play content according to an embodiment of the present disclosure.

FIG. 8 is a flow diagram illustrating a case where a new playback device joins a group while a plurality of playback devices play content according to an embodiment of the present disclosure.

Referring to FIG. 8, a first playback device and a second playback device included in the group start synchronized playback in operation 801. Herein, the reference device is the first playback device.

In operation 802, a third playback device transmits a group join request to a master device while the first playback device and the second playback device perform synchronized playback. That is, the third playback device may discover the master device or the group of the master device through a discovery process and join the group. Herein, various communication protocols may be used in the discovery process.

In operation 803, upon receiving the group join request during content streaming, the master device notifies an identifier of the first playback device that is the reference device, to the current group members (first playback device and second playback device) and the third playback device that is a new group member.

In operation 804, the master device multicasts a synchronization packet to the first to third playback devices.

In operation 805, the second playback device determines a clock difference by obtaining a synchronization packet reception time of the reference device. As described above, the clock difference may be included in the synchronization time, or the synchronization time may be determined by the clock difference. The second playback device stores the previously-determined clock difference since it was already performing synchronized playback. However, when the newly-determined clock difference is different from the previously-determined clock difference, the second playback device performs content playback based on the newest clock difference, in operation 806.

In operation 807, the third playback device obtains a synchronization packet reception time of the reference device. In the present embodiment, the other playback devices inquire the reference device about the synchronization packet reception time and receive a response to the inquiry. However, in other various embodiments, the reference device may notify its own synchronization packet reception time to the other playback devices automatically upon receiving the synchronization packet even when there is no inquiry.

In operation 808, the third playback device determines a clock difference from the reference device. That is, the third playback device may determine a synchronization time with the reference device.

In operation 809, the master device streams the content to the third playback device as well as to the first playback device and the second playback device that are the current group members.

In this manner, even when a new playback device joins the group during the synchronized content playback, the new playback device performs synchronization with the reference device, and the master device performs time stamping based on the clock of the reference device. Therefore, the current streaming is not interrupted.

In the present embodiment, when a new playback device joins the group during the streaming, the current playback device (e.g., second playback device) performs synchronization again. However, in another embodiment, synchronization may be performed only between the new playback device and the reference device. In this case, signals related to the second playback device may be omitted in operations 803 to 805.

Figure 9:
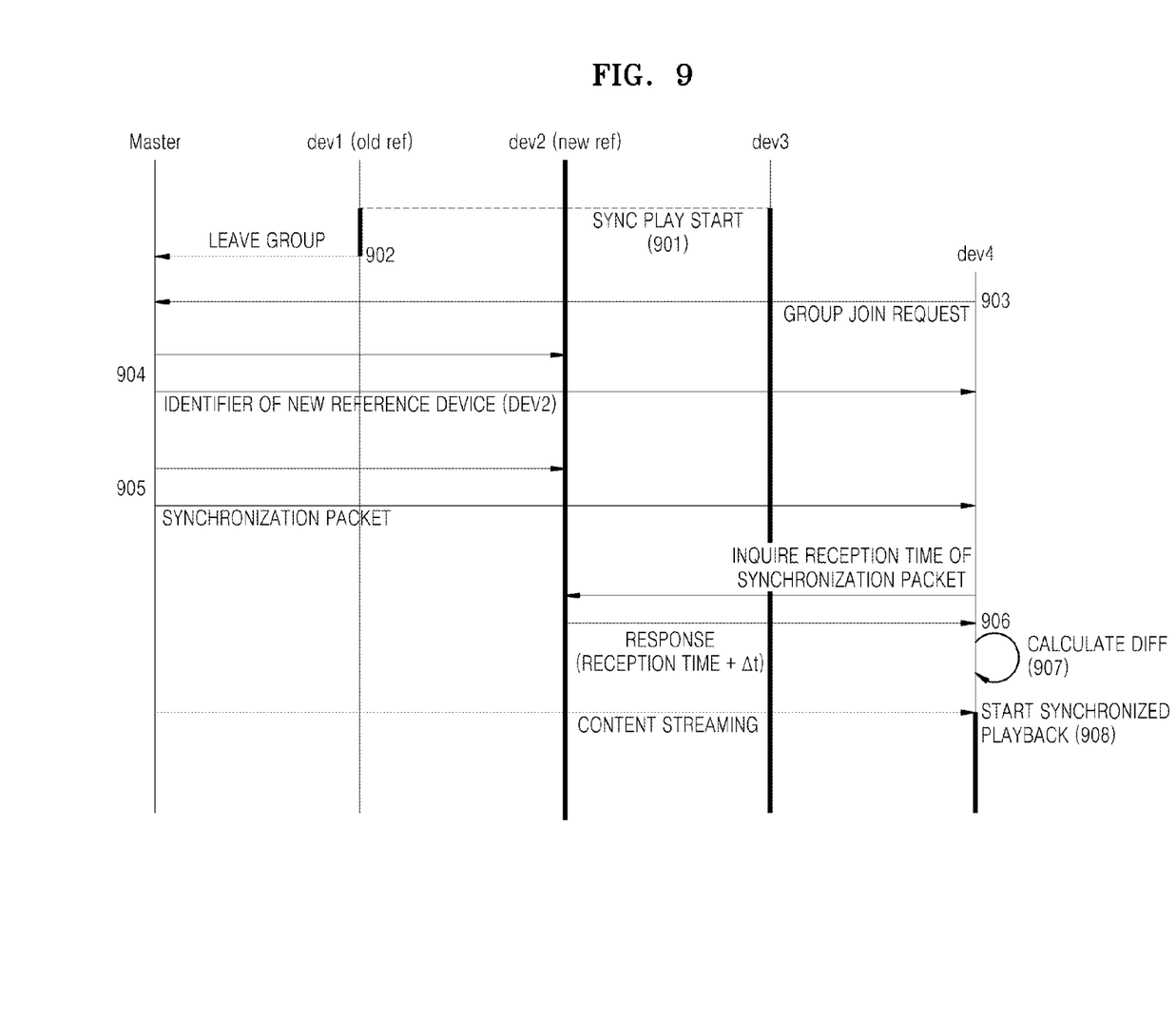
FIG. 9 is a flow diagram illustrating a case where a reference device leaves a group while a plurality of playback devices play content according to an embodiment of the present disclosure.

FIG. 9 is a flow diagram illustrating a case where a reference device leaves the group while a plurality of playback devices play the content according to an embodiment of the present disclosure.

Referring to FIG. 9, a first playback device, a second playback device, and a third playback device start synchronized playback in operation 901. Herein, the reference device is the first playback device.

In operation 902, the first playback device that is the reference device transmits a group leave message to a master device. The first playback device automatically transmits the group leave message to the master device when the first playback device leaves the group since the first playback device is powered off, since the connection is terminated due to a poor channel condition between the master device and the first playback device, or since the user intentionally disables a network function of the first playback device. Even when the first playback device has left the group, the current streaming is not interrupted since the second playback device and the third playback device already has determined the clock difference from the first playback device, and the master device inserts a time stamp based on the clock of the first playback device.

In operation 903, a fourth playback device transmits a group join message to the master device during the streaming.

In operation 904, the master device notifies an identifier of the second playback device, which is a new reference device, to the second playback device and the fourth playback device. That is, upon receiving its own identifier from the master device during the streaming, the second playback device interprets the received identifier as a message indicating that the second playback device has been selected as a new reference device. In another embodiment, in addition to the identifier of the second playback device, a message indicating that the second playback device has been selected as a new reference device may be defined.

Herein, it is assumed that the master device selects the second playback device as a new reference device. However, a criterion for selecting a new reference device when the current reference device has left the group is not limited to a particular one. For example, the second playback device, which is discovered next to the current reference device in the discovery process in the network, may be selected as a new reference device. Alternatively, one of the playback devices remaining in the group may be randomly selected as a new reference device, or a new reference device may be selected based on various factors such as channel conditions and resources of devices.

The time when the master device selects a new reference device may be between operation 902 and operation 903, that is, immediately after the current reference device leaves the group, or after operation 903 and operation 904, that is, immediately after the new fourth playback device transmits a group join request to the master device.

In operation 905, the master device multicasts a synchronization packet to the new reference device and the fourth playback device.

In operation 906, the fourth playback device inquires the new reference device about a synchronization packet reception time of the new reference device. In this case, the new reference device reflects the previously-determined clock difference, that is, a clock difference Δt from the first playback device that has left the group, in its own actual reception time and notifies the result to the fourth playback device. For example, when the clock difference from the first playback device is +0.1 seconds and the synchronization packet reception time in operation 905 is 12:00.00, the new reference device notifies a time of 11:59.59 to the fourth playback device in response to the inquiry of the fourth playback device. The time stamp has been inserted into the content streamed by the master device based on the clock of the first playback device. Therefore, even when the reference device has been changed, the playback devices play the content based on the clock of the current reference device in order to provide seamless streaming.

In operation 907, the fourth playback device determines a clock difference based on the time information received from the new reference device. Herein, the determined clock difference refers to the clock difference between the first playback device and the fourth playback device. Also, as described above, the fourth playback device may determine a synchronization time based on the clock difference.

In operation 908, the master device adds the fourth playback device as a content streaming target, and the fourth playback device plays the content based on the clock difference determined in operation 907. Thus, the fourth playback device performs synchronized playback together with the second playback device and the third playback device.

As described above, when a new playback device joins the group during the streaming, a time synchronization process may be performed on all the playback devices again or may be performed only on the new playback device. That is, in the present embodiment, a process corresponding to operations 904 to 907 may be repeated in the third playback device. However, unlike the embodiment of FIG. 8, in the present embodiment, it is assumed that only the fourth playback device performs synchronization.

Figure 10:
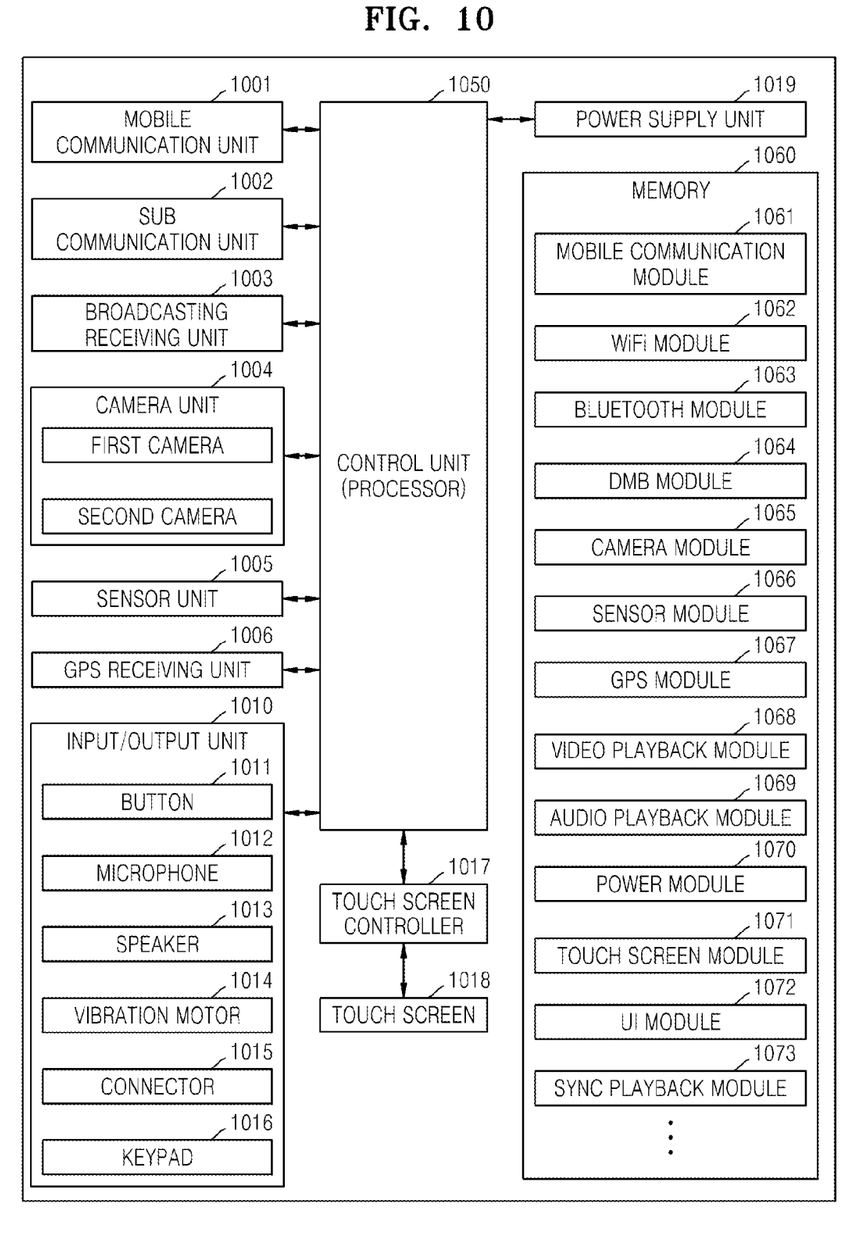
FIG. 10 is a block diagram of a terminal that may operate as a playback device or a master device according to an embodiment of the present disclosure.

FIG. 10 is a block diagram of a terminal that may operate as a playback device or a master device according to an embodiment of the present disclosure.

Referring to FIG. 10, a mobile communication unit 1001 performs call setup and data communication through a cellular network such as 3G/4G. A sub communication unit 1002 performs a function for short-range communication such as Bluetooth and NFC. A broadcast receiving unit 1003 receives a Digital Multimedia Broadcasting (DMB) broadcast signal.

A camera unit 1004 includes lenses and optical devices for capturing pictures or moving images.

A sensor unit 1005 may include a gravity sensor for sensing motion of the terminal, a light sensor for sensing the brightness of light, a proximity sensor for sensing the proximity of humans, and a motion sensor for sensing the motions of humans.

A Global Positioning System (GPS) receiver 1006 receives GPS signals from satellites. The GPS signals may be used to provide various services to the user.

An input/output unit 1010 provides an interface with external devices or humans, and includes a button 1011, a microphone 1012, a speaker 1013, a vibration motor 1014, a connector 1015, and a keypad 1016.

A touchscreen 1018 receives a touch input of the user. Herein, the touch input may result from a drag gesture or a tap gesture. A touchscreen controller 1017 provides a touch input, which is input through the touchscreen 1018, to a control unit 1050. A power supply unit 1019 is connected to a battery or an external power source to supply power to a multi-vision controller.

The control unit 1050 causes the terminal to operate as a playback device or a master device according to various embodiments of the present disclosure, by executing programs stored in a memory 1060.

The programs stored in the memory 1060 may be classified into a plurality of modules according to their functions. For example, the programs stored in the memory 1060 may be classified into a mobile communication module 1061, a WiFi module 1062, a Bluetooth module 1063, a DMB module 1064, a camera module 1065, a sensor module 1066, a GPS module 1067, a video playback module 1068, an audio playback module 1069, a power module 1070, a touchscreen module 1071, a User Interface (UI) module 1072, a sync playback module 1073, etc.

Those of ordinary skill in the art may intuitively infer the functions of the respective modules from their names, and thus only the sync playback module 1073 will be described herein. When the terminal creates a group including other playback devices according to a user input, the sync playback module 1073 allows the terminal to operate as a master device. That is, the sync playback module 1073 includes instructions for causing the terminal to select one of the group members as a reference device, multicast a synchronization packet to the group members, insert a time stamp into content based on the clock of the reference device, and stream the content to the playback devices.

In addition, when a new playback device joins the group during the streaming, the sync playback module 1073 multicasts a synchronization packet to the other playback devices, including the new playback device, so that the new playback device may perform time synchronization with a reference device, and adds the new playback device as a content streaming target. Also, when the current reference device leaves the group and a new playback device joins the group during the streaming, the sync playback module 1073 selects one of the playback devices remaining in the group as a new reference device and multicasts a synchronization packet so that the new playback device may perform time synchronization with the new reference device.

When the terminal operates as the playback device, the sync playback module 1073 determines a clock difference between the reference device and the terminal and plays the content streamed from the master device. While the terminal is operating as the playback device, when an identifier of the terminal is received from the master device, a synchronization packet is received from the master device and the new playback device inquires about the reception time of the synchronization packet during the streaming, the sync playback module 1073 notifies time information, which reflects a clock difference determined by the terminal at the synchronization packet reception time, that is, a clock difference between the previous reference device and the terminal, to the new playback device. That is, the sync playback module 1073 may notify a synchronization time to the playback device.

The various embodiments of the present disclosure may be written as computer programs and may be implemented in general-use digital computers that execute the programs by using a computer-readable recording medium.

Examples of the computer-readable recording medium include magnetic storage media (e.g., ROM, floppy disks, hard disks, etc.), optical recording media (e.g., CD-ROMs, DVDs, etc.), and transmission media such as Internet transmission media.

It should be understood that the various embodiments described herein should be considered in a descriptive sense only and not for purposes of limitation. Descriptions of features or aspects within each embodiment should typically be considered as available for other similar features or aspects in other various embodiments.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of allowing a master device to stream content to a plurality of playback devices, the method comprising:
   selecting one of the playback devices as a reference device;
   notifying an identifier of the reference device to the playback devices;

multicasting a first synchronization packet to the playback devices to allow the playback devices to determine a synchronization time with the reference device based on a reception time of the first synchronization packet;

receiving clock information from the reference device; and streaming content, into which a time stamp is inserted based on the clock information, to the playback devices, wherein the synchronization time is a clock difference of the reception time between the playback devices and the reference device, and wherein the clock information is determined based on reception times of the first synchronization packet at each of the playback devices.

2. The method of claim 1, further comprising:

when a join request for a group including the playback devices is received from a new playback device during the streaming, notifying the identifier of the reference device to the new playback device;

multicasting a second synchronization packet to the new playback device and the playback devices to allow the new playback device to determine a synchronization time with the reference device based on a reception time of the second synchronization packet; and additionally streaming content, into which a time stamp is inserted based on the clock information, to the new playback device.

3. The method of claim 1, wherein the selecting of one of the playback devices as the reference device comprises selecting a playback device, which is first discovered in a process of discovering the playback devices according to a communication protocol, as a reference device.

4. The method of claim 1, further comprising:

when a join request for a group including the playback devices is received from a new playback device during the streaming after the reference device leaves the group including the playback devices, selecting a new reference device among other playback devices except the new playback device;

notifying an identifier of the new reference device to the new playback device;

multicasting a third synchronization packet to the new playback device and the other playback devices to allow the new playback device to determine a synchronization time with the reference device, which has left the group, based on a reception time of the third synchronization packet in the new reference device; and additionally streaming content, into which a time stamp is inserted based on the clock information, to the new playback device.

5. The method of claim 4, wherein the selecting of the new reference device comprises selecting a playback device, which is discovered next to the reference device in the discovery process, as a new reference device.

6. The method of claim 1, wherein the multicasting of the first synchronization packet comprises sequentially multicasting a plurality of synchronization packets having different sequence numbers to allow the playback devices to accurately determine a synchronization time.

7. The method of claim 1, wherein the synchronization time represents a system clock difference between each of the playback devices and the reference device.

8. A non-transitory computer-readable recording medium that stores a program that, when executed by a computer, performs the method of claim 1.

9. A master device comprising:

a memory configured to store at least one program; and a processor configured to stream content to a plurality of playback devices by executing the at least one program, wherein the at least one program comprises instructions for performing:

selecting one of the playback devices as a reference device;

notifying an identifier of the reference device to the playback devices;

multicasting a first synchronization packet to the playback devices to allow the playback devices to determine a synchronization time with the reference device based on a reception time of the first synchronization packet;

receiving clock information from the reference device; and streaming content, into which a time stamp is inserted based on the clock information, to the playback devices, wherein the synchronization time is a clock difference of the reception time between the playback devices and the reference device, and wherein the clock information is determined based on reception times of the first synchronization packet at each of the playback devices.

10. The master device of claim 9, wherein the at least one program further comprises instructions for performing:

when a join request for a group including the playback devices is received from a new playback device during the streaming, notifying the identifier of the reference device to the new playback device;

multicasting a second synchronization packet to the new playback device and the playback devices to allow the new playback device to determine a synchronization time with the reference device based on a reception time of the second synchronization packet; and additionally streaming content, into which a time stamp is inserted based on the information clock, to the new playback device.

11. The master device of claim 9, wherein the selecting of one of the playback devices as the reference device comprises selecting a playback device, which is first discovered in a process of discovering the playback devices according to a communication protocol, as a reference device.

12. The master device of claim 9, wherein the at least one program further comprises instructions for performing:

when a join request for a group including the playback devices is received from a new playback device during the streaming after the reference device leaves the group including the playback devices, selecting a new reference device among other playback devices except the new playback device;

notifying an identifier of the new reference device to the new playback device;

multicasting a third synchronization packet to the new playback device and the other playback devices to allow the new playback device to determine a synchronization time with the reference device, which has left the group, based on a reception time of the third synchronization packet in the new reference device; and additionally streaming content, into which a time stamp is inserted based on the clock information, to the new playback device.

13. The master device of claim 12, wherein the selecting of the new reference device comprises selecting a playback device, which is discovered next to the reference device in the discovery process, as a new reference device.

14. The master device of claim 12, wherein the multicasting of the first synchronization packet comprises sequentially multicasting a plurality of synchronization packets having different sequence numbers to allow the playback devices to accurately determine a synchronization time.

15. The master device of claim 12, wherein the synchronization time represents a system clock difference between each of the playback devices and the reference device.

16. A method of allowing one of a plurality of playback devices to play content streamed from a master device, with other playback devices, the method comprising:
    receiving an identifier of a reference device selected among the payback devices by the master device;
    receiving a synchronization packet which is multicast from the master device to the playback devices;
    determining a reception time of the synchronization packet of the reference device;
    determining a synchronization time with the reference device; and
    playing the content streamed from the master device, in synchronization with the reference device based on the determined synchronization time,
    wherein the synchronization time corresponds to a difference of reception times of the synchronization packet at the playback devices and a reception time of the synchronization packet at the reference device.

17. The method of claim 16, wherein the content streamed from the master device comprises a time stamp that is generated based on clock information of the reference device.

18. The method of claim 16, wherein the determining of the synchronization time comprises:
    determining reception time difference values from the reference device with respect to a plurality of synchronization packets having different sequence numbers; and
    determining an average value of the reception time difference values with respect to the plurality of synchronization packets as the synchronization time with the reference device.

19. The method of claim 16, wherein the receiving of the identifier of the reference device comprises receiving the identifier of the reference device from the master device.

20. The method of claim 16, further comprising:
    receiving a new synchronization packet and a message indicating that a new reference device has been selected, from the master device;
    receiving an inquiry about a reception time of the new synchronization packet, from a new playback device other than the playback devices; and
    notifying a value reflecting the determined synchronization time in response to the inquiry at the reception time of the new synchronization packet.

21. The method of claim 16, wherein the determining of the synchronization time comprises determining a system clock difference from the reference device based on the reception time of the synchronization packet.

22. A playback device comprising:
    a memory configured to store at least one program; and
    a processor configured to allow one of a plurality of playback devices to play content, which is streamed from a master device, simultaneously with other playback devices by executing the at least one program,
    wherein the at least one program comprises instructions for performing:
        receiving an identifier of a reference device selected among the payback devices by the master device;
        receiving a synchronization packet which is multicast from the master device to the playback devices;
        determining a reception time of the synchronization packet of the reference device indicated by the identifier;
        determining a synchronization time with the reference device; and
        playing the content streamed from the master device, in synchronization with the reference device based on the determined synchronization time, and
    wherein the synchronization time corresponds to a difference of reception times of the synchronization packet at the playback devices and a reception time of the synchronization packet at the reference device.

23. The playback device of claim 22, wherein the content streamed from the master device comprises a time stamp that is generated based on clock information of the reference device.

24. The playback device of claim 22, wherein the determining of the synchronization time comprises:
    determining reception time difference values from the reference device with respect to a plurality of synchronization packets having different sequence numbers; and
    determining an average value of the reception time difference values with respect to the plurality of synchronization packets as the synchronization time with the reference device.

25. The playback device of claim 22, wherein the of the receiving of the reference device comprises receiving the identifier of the reference device from the master device.

26. The playback device of claim 22, wherein the at least one program further comprises instructions for performing:
    receiving a new synchronization packet and a message indicating that a new reference device has been selected, from the master device;
    receiving an inquiry about a reception time of the new synchronization packet, from a new playback device other than the playback devices; and
    notifying a value reflecting the determined synchronization time in response to the inquiry at the reception time of the new synchronization packet.

27. The playback device of claim 22, wherein the determining of the synchronization time comprises determining a system clock difference from the reference device based on the reception time of the synchronization packet.

* * * * *